US009100941B2

(12) United States Patent
Ratasuk et al.

(10) Patent No.: US 9,100,941 B2
(45) Date of Patent: Aug. 4, 2015

(54) USING UNIQUE PREAMBLES FOR D2D COMMUNICATIONS IN LTE

(75) Inventors: Rapeepat Ratasuk, Hoffman Estates, IL (US); Sassan Iraji, Espoo (FI); Antti Piipponen, Vantaa (FI); Antti Sorri, Helsinki (FI); Mikko Aleksi Uusitalo, Helsinki (FI); Nitin Mangalvedhe, Hoffman Estates, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 507 days.

(21) Appl. No.: 13/479,477

(22) Filed: May 24, 2012

(65) Prior Publication Data

US 2013/0315152 A1 Nov. 28, 2013

(51) Int. Cl.
  *H04W 76/02* (2009.01)
  *H04W 4/00* (2009.01)
  *H04W 16/14* (2009.01)

(52) U.S. Cl.
  CPC ............ *H04W 76/023* (2013.01); *H04W 4/005* (2013.01); *H04W 16/14* (2013.01)

(58) Field of Classification Search
  None
  See application file for complete search history.

(56) References Cited

U.S. PATENT DOCUMENTS

| | | | |
|---|---|---|---|
| 7,970,066 B1 | 6/2011 | Lee et al. | |
| 8,064,834 B2 * | 11/2011 | Kim et al. | 455/45 |
| 8,620,336 B2 * | 12/2013 | Golaup et al. | 455/450 |
| 8,781,484 B2 * | 7/2014 | Baldemair et al. | 455/450 |
| 2007/0248175 A1 | 10/2007 | Bruninghaus et al. | |
| 2008/0095254 A1 | 4/2008 | Muharemovic et al. | |
| 2010/0067599 A1 | 3/2010 | Dayal et al. | |
| 2011/0237265 A1 | 9/2011 | Sugawara et al. | |
| 2012/0115518 A1 * | 5/2012 | Zeira et al. | 455/500 |
| 2012/0322479 A1 * | 12/2012 | Hakola et al. | 455/507 |
| 2014/0016624 A1 * | 1/2014 | Zou et al. | 370/336 |

FOREIGN PATENT DOCUMENTS

| | | |
|---|---|---|
| WO | WO 2011/036507 A1 | 3/2011 |
| WO | WO 2011/161560 A1 | 12/2011 |
| WO | WO 2012/052911 A1 | 4/2012 |

OTHER PUBLICATIONS

RP-111094, "Discussions on Carrier Aggregation across LTE and WIFI", 3GPP TSG-RAN meeting #53, Sep. 2011, 4 pgs.
RP-111094, "New Study Item Proposal for Opportunistic Carrier Aggregation across 3GPP-LTE and WLAN", 3GPP TSG-RAN meeting #53, Sep. 2011, 5 pgs.

(Continued)

*Primary Examiner* — Alex Skripnikov
(74) *Attorney, Agent, or Firm* — Harrington & Smith

(57) ABSTRACT

A method is disclosed that includes determining a preamble, at least a portion of which is unique to one or more user equipment for a device-to-device communication of one or more subframes on a band, and performing the device-to-device communication of the one or more subframes comprising the preamble on the band. The band could be, e.g., a lightly-licensed band, a licensed-exempt or unlicensed band, a secondary usage of a band of the licensed band, a band in TV white space, or a licensed band. Apparatus and computer program products are also disclosed.

15 Claims, 12 Drawing Sheets

(56) References Cited

OTHER PUBLICATIONS

Liu, et al., "A Framework for Femtocells to Access Both Licensed and Unlicensed Bands", 2011 International Symposium on Modeling and Optimization in Mobile, Ad Hock and Wireless Networks (WiOpt), May 2011, 5 pgs.

"IEEE Standard for Information technology—Telecommunications and information exchange between systems—Local and metropolitan area networks—Specific requirements—Part 11: Wireless LAN Medium Access Control (MAC) and Physical Layer (PHY) Specifications—Section 17.3.3", IEEE Std 802.11™-2007, Jun. 12, 2007, 3 pgs.

* cited by examiner

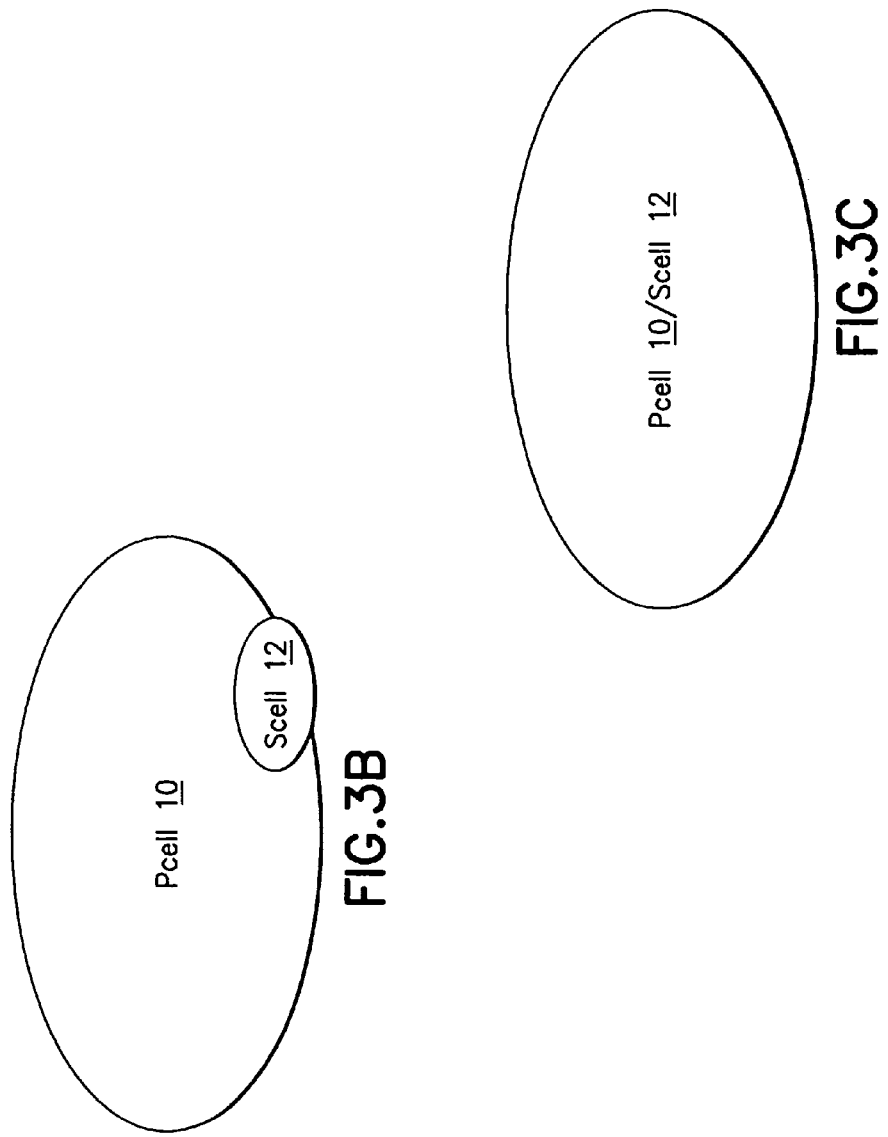

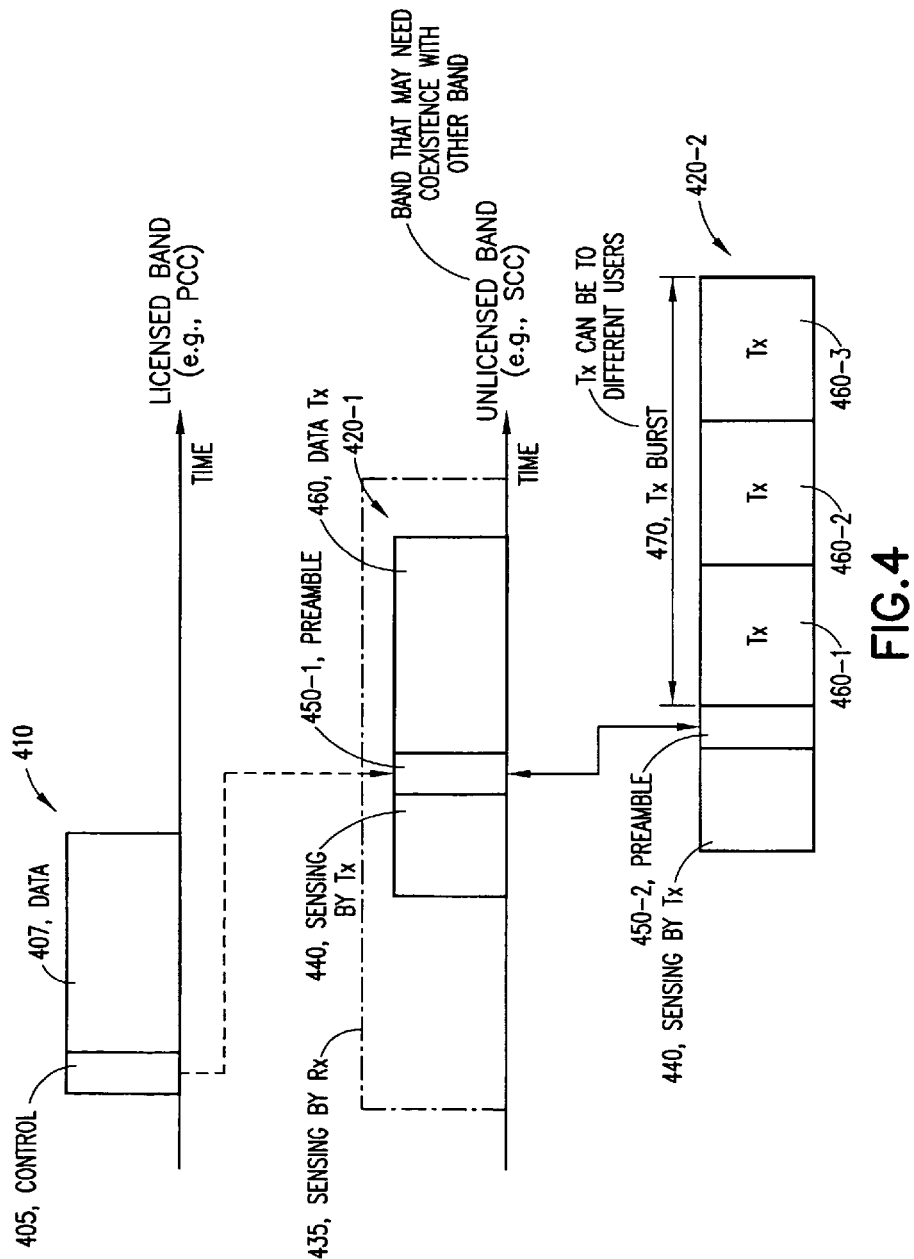

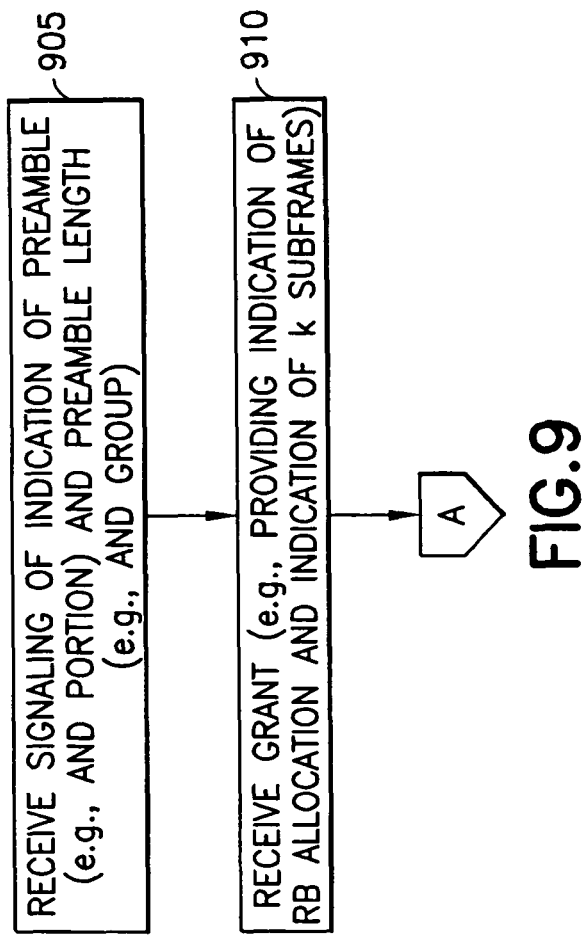

USING UNIQUE PREAMBLES FOR D2D COMMUNICATIONS IN LTE

TECHNICAL FIELD

This invention relates generally to wireless networks and, more specifically, relates to device-to-device (D2D) communications in cellular networks.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

The following abbreviations that may be found in the specification and/or the drawing figures are defined as follows:

3GPP Third Generation Partnership Project
ACK Acknowledge
AGC Automatic Gain Control
ARQ Automatic Repeat reQuest
C-RNTI Cell-RNTI
D2D Device-to-Device
DL DownLink (from base station to user equipment)
DMRS DeModulation Reference Signal
eNB or eNode B evolved Node B (LTE base station)
GP Guard Period
ID identification
ISM Industrial Scientific Medical
LTE Long Term Evolution
MAC Media Access Control
M2M Machine-to-Machine
MCS Modulation and Coding Scheme
MME Mobility Management Entity
MTC Machine-Type Communication
NACK Negative Acknowledge
NCE Network Control Element
OFDM Orthogonal Frequency Division Multiplexing
PCC Primary Component Carrier
Pcell Primary cell
PDCCH Physical Downlink Control CHannel
PHICH Physical Hybrid ARQ CHannel
PHY physical layer (L1)
PUSCH Physical Uplink Shared CHannel
PSS Primary Synchronization Signal
RB Resource Block
Rel Release
RNTI Radio Network Temporary Identifier
RRC Radio Resource Control
Rx Receiver or reception
SCC Secondary Component Carrier
Scell Secondary cell
SGW Serving GateWay
SNR Signal to Noise Ratio
SSS Secondary Synchronization Signal
Tx Transmitter or transmission
UE User Equipment
UL UpLink
WLAN Wireless Local Area Network With increasing numbers of smart phones and machines (such as sensors) connected to wireless networks, the amount of wireless data might increase 100 fold in the next five years. Already, smart phones are facing a lack of capacity in some networks. All methods to help with this lack of capacity are being examined.

One approach is to use unlicensed frequencies (e.g., ISM bands) for LTE operation, when available, in order to get more capacity for LTE. Using unlicensed bands for LTE presents a lot of challenges. This is due to the fact that LTE has been fundamentally designed for licensed bands with careful consideration of resource allocations, synchronization, scheduling, and interference management (to name a few aspects). By moving to the unlicensed band, many of those designed features cannot be easily retained. On the other hand, LTE accessing unlicensed bands has to coexist with many incumbent devices like BLUETOOTH (an open wireless technology standard for exchanging data over short distances) and WiFi (a technology that allows an electronic device to exchange data wirelessly over a computer network). Therefore, a careful consideration for sharing the spectrum from unlicensed bands is needed.

SUMMARY

This section contains examples of possible implementations and is not meant to be limiting.

A method is disclosed that includes determining a preamble, at least a portion of which is unique to one or more user equipment for a device-to-device communication of one or more subframes on a band, and performing the device-to-device communication of the one or more subframes comprising the preamble on the band.

In another example, an apparatus is disclosed that includes means for determining a preamble, at least a portion of which is unique to one or more user equipment for a device-to-device communication of one or more subframes on a band, and means for performing the device-to-device communication of the one or more subframes comprising the preamble on the band.

In another exemplary embodiment, an apparatus is disclosed that includes one or more processors and one or more memories including computer program code. The one or more memories and the computer program code configured, with the one or more processors, to cause the apparatus to perform: determining a preamble, at least a portion of which is unique to one or more user equipment for a device-to-device communication of one or more subframes on a band; and performing the device-to-device communication of the one or more subframes comprising the preamble on the band In a further exemplary embodiment, a computer program product is disclosed that includes a computer-readable storage medium bearing computer program code embodied therein for use with a computer, the computer program code comprising code for determining a preamble, at least a portion of which is unique to one or more user equipment for a device-to-device communication of one or more subframes on a band; and code fore performing the device-to-device communication of the one or more subframes comprising the preamble on the band.

BRIEF DESCRIPTION OF THE DRAWINGS

In the attached Drawing Figures.

FIG. 3B is one example of a Pcell and an Scell;

FIG. 3C is another example of a Pcell and an Scell;

FIG. 4 provides examples of licensed and unlicensed band communication scenarios;

DETAILED DESCRIPTION OF THE DRAWINGS

As stated above, there are problems with sharing the spectrum from unlicensed bands. The discussion on the need to have better cooperation between LTE and WiFi systems is increasing all the time.

As an example, in 3GPP, INTEL (a company that designs and builds the essential technologies that serve as the foundation for the world's computing devices) has recently proposed to start a study item on LTE+WLAN carrier aggregation, including the idea of simultaneous use of WLAN on unlicensed frequencies and LTE on licensed frequencies. See RP-111094, "Discussions on Carrier Aggregation across LTE and WIFI", 3GPP TSG-RAN (Technical Service Group-Radio Access Network) meeting #53, September, 2011. Several operators have supported this idea.

Figure 1:
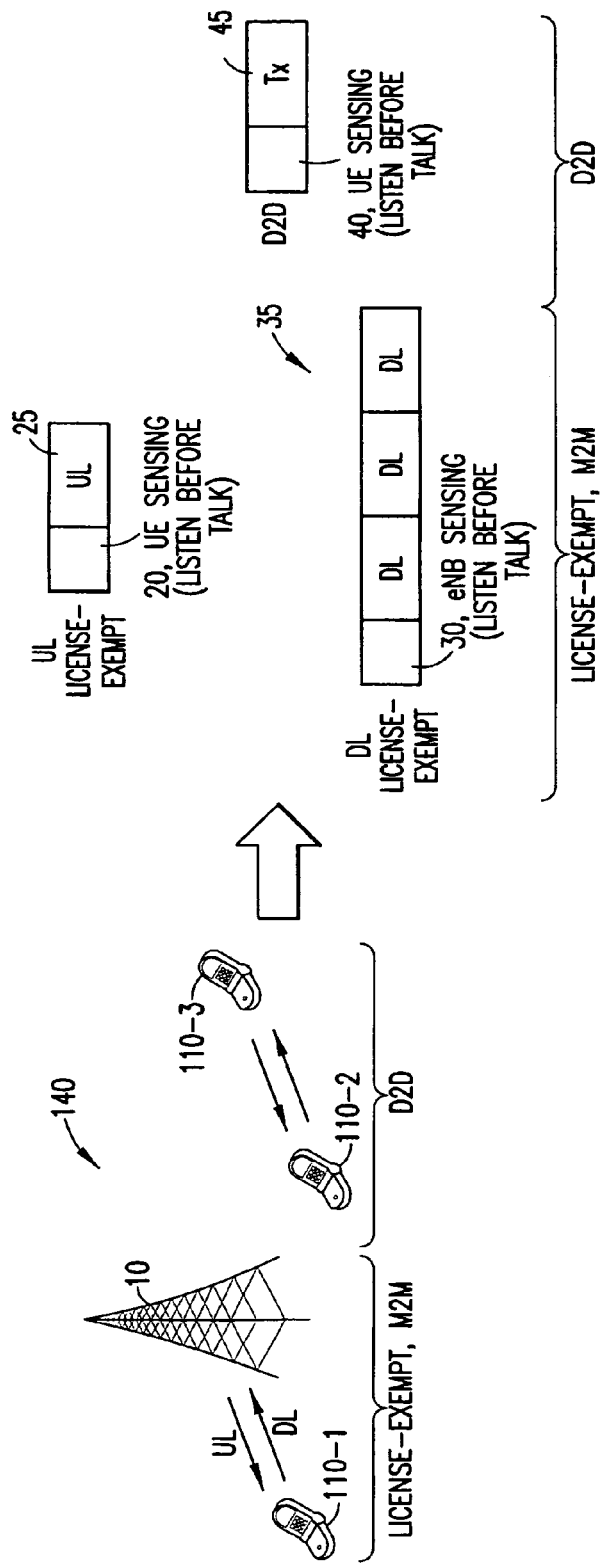
FIG. 1 is an illustration of exemplary communication scenarios in the unlicensed band.

The next step is to study usage of LTE itself on unlicensed bands. This has been studied for some time, with an increasing amount of solutions. The coexistence (e.g., of LTE and WiFi) problem has been addressed also. In Rel-12/Rel-13, in LTE usage for license-exempt (i.e., unlicensed) band, both D2D (device-to-device) and M2M (machine-to-machine) work items are being proposed. For instance, FIG. 1 provides an illustration of exemplary communication scenarios in the unlicensed band. The scenarios include a license-exempt communication from the UE 110-1 to the cell 10 (formed under control of eNB 140), a M2M communication from the UE 110-1 to the cell 10 (and, e.g., to another machine such as a server, not shown, on the Internet), and a D2D communication between UEs 110-2 and 110-3. In all cases, unsynchronized transmissions may be adopted in LTE. All stations monitor the channel continuously, and may begin transmission when the channel has been free. In the license-exempt/M2M scenarios, for uplink, the UE performs listen-before-talk and senses 20 the unlicensed channel, then transmits 25 in uplink. Meanwhile, the eNB 140 listens to the unlicensed band continuously. For the downlink, the eNB 140 senses 30 and performs multiple DL transmissions 35, while the corresponding UE(s) 110 listen to the unlicensed band continuously. For the D2D transmissions, one UE 110-2 (for instance) performs sensing 40 then transmission 45, while the other UE 110-3 listens to the unlicensed band. However, in unlicensed and unsynchronized transmissions, the system may not have periodic signals for receiver reference. These signals are needed to perform timing and frequency acquisition, and automatic gain control. A cyclic prefix may be used but performance may not be adequate.

Figure 2:
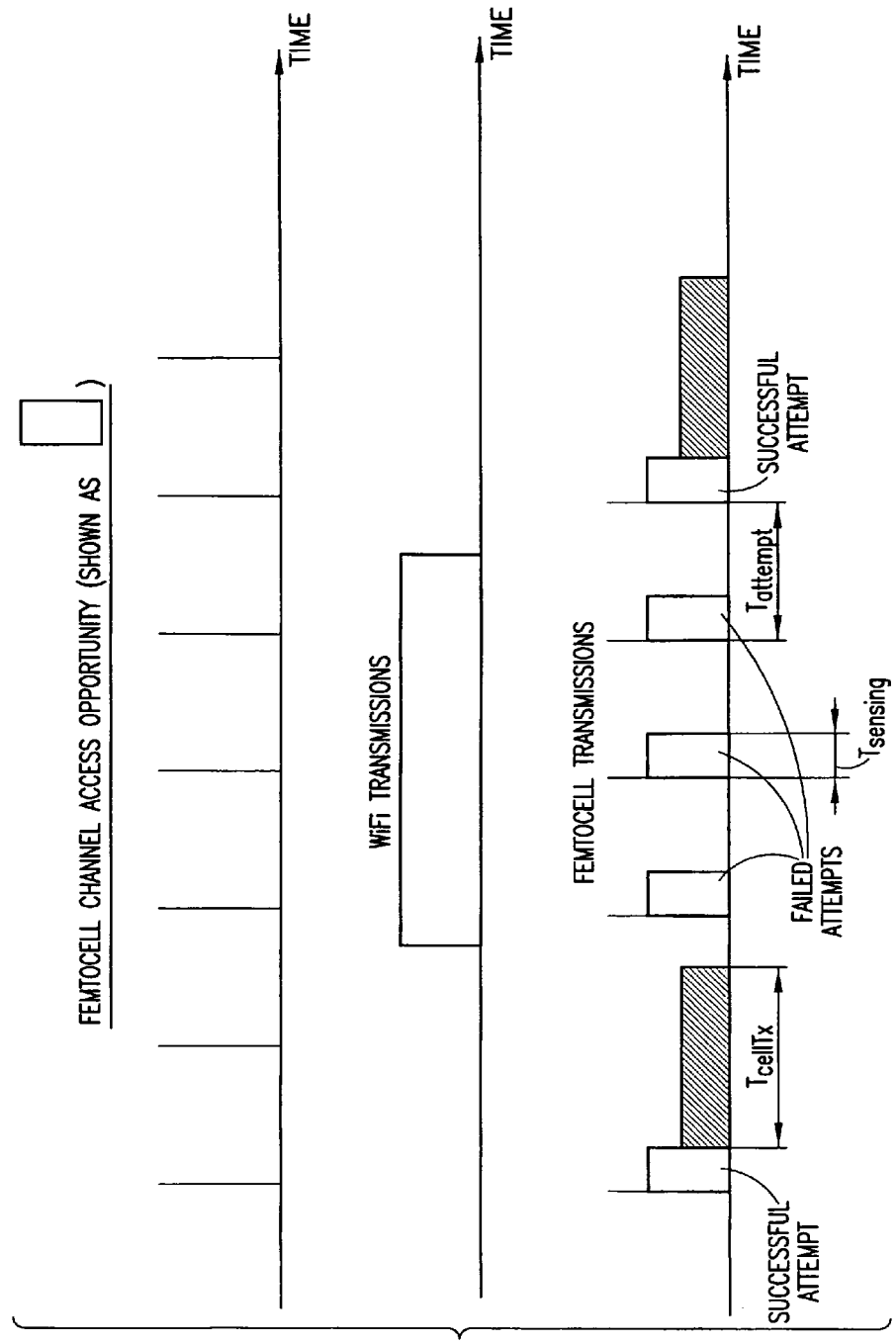
FIG. 2 is a version of FIG. 1 of Liu, et al., "A Framework for Femtocells to Access Both Licensed and Unlicensed Bands", 2011 International Symposium on Modeling and Optimization in Mobile, Ad Hoc and Wireless Networks (WiOpt), May 2011.

Further studies of LTE and unlicensed bands have considered some of these issues. In a paper authored by Liu et al., the authors analytically modeled the performance of coexisting femtocells (e.g., LTE) and WiFi networks operating over a fully-utilized unlicensed band. See Liu, et al., "A Framework for Femtocells to Access Both Licensed and Unlicensed Bands", 2011 International Symposium on Modeling and Optimization in Mobile, Ad Hoc and Wireless Networks (WiOpt), May 2011. The authors proposed and analyzed a synchronized channel access mechanism where the femto base stations access the channel only at predesigned periodic time instants which they call "access opportunities". This approach is quite synchronized in which sensing of the unlicensed channels for transmission of data happens periodically and the approach is synchronized with femtocell channel access opportunity signals. FIG. 2 is a version of FIG. 1 of Liu, et al., and illustrates a femtocell channel access mechanism for the unlicensed band in Liu.

The biggest disadvantage to the Liu et al. scheme is that the discrete access opportunities only provide very limited possibilities especially in a congested channel: the channel must be free at exactly the access opportunity time. WLAN systems do not work like this, but have a much more efficient channel access mechanism. All stations monitor the channel continuously, and may begin transmission when the channel has been free for a long enough period.

One assumption in the conventional systems is that control signals, during both channel access and data transmission phases, are exchanged only in the licensed cellular band. Meanwhile, unlicensed bands only convey data traffic. This is because licensed bands are more reliable than the unlicensed band.

Figure 3A:
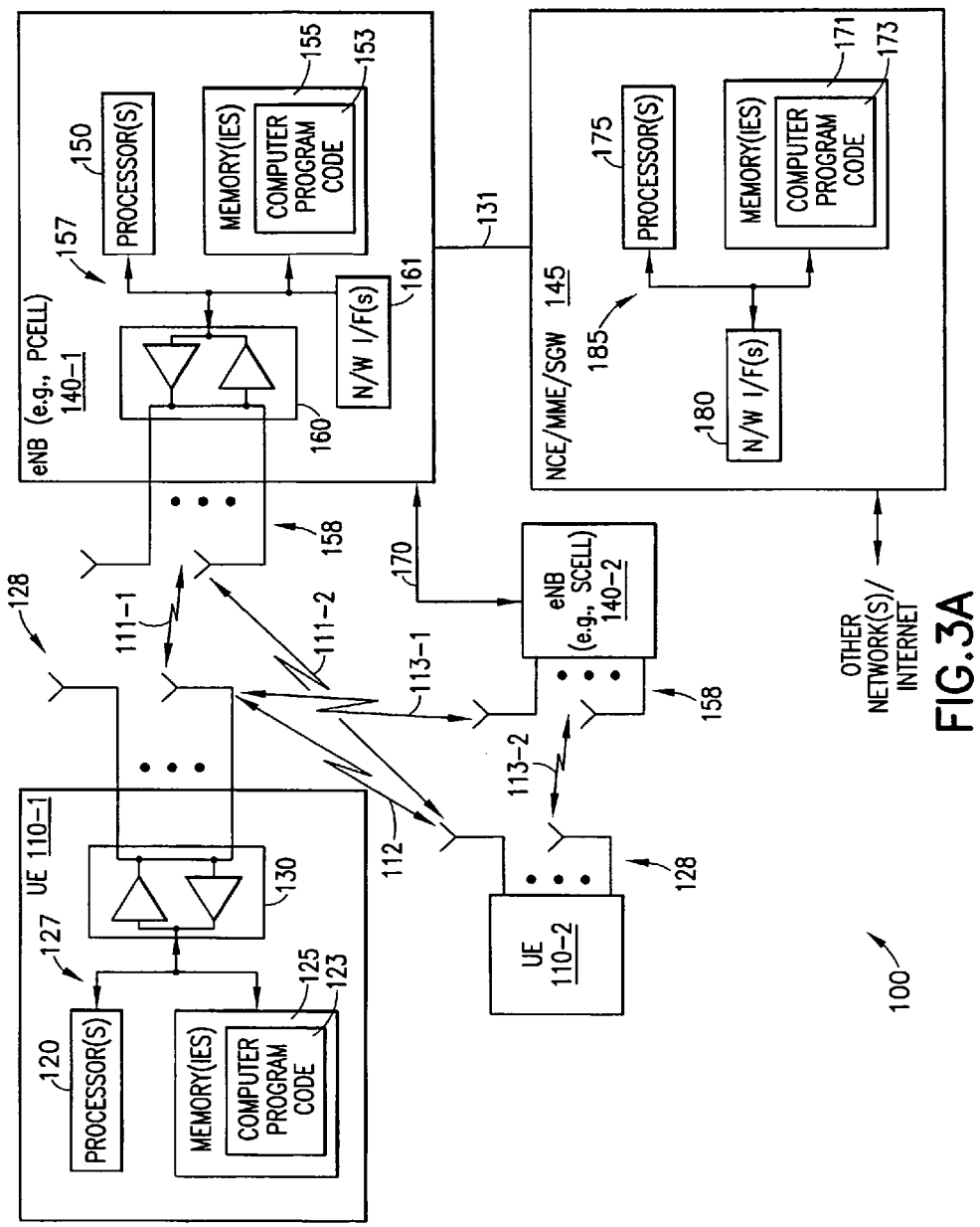
FIG. 3A is a block diagram of an exemplary system in which the exemplary embodiments may be practiced.

Before proceeding with description of exemplary embodiments that correct or reduce these problems, reference is now made to FIG. 3A, where a block diagram is shown of an exemplary system in which the exemplary embodiments may be practiced. In FIG. 3A, two UEs 110-1 and 110-2 may be in wireless communication with a wireless network 100 via corresponding wireless links 111-1, 111-2, 113-1, 113-2, or be in wireless communication with each other via wireless link 112. Each user equipment 110 includes one or more processors 120, one or more memories 125, and one or more transceivers 130 interconnected through one or more buses 127. The one or more transceivers 130 are connected to one or more antennas 128. The one or more memories 125 include computer program code 123. The one or more memories 125 and the computer program code 123 are configured to, with the one or more processors 120, cause the corresponding user equipment 110 to perform one or more of the operations as described herein. The UEs 110 communicate with eNB 140-1 via a corresponding link 111 and communicate with eNB 140-2 via a corresponding link 113.

The eNB 140-1 and 140-2 are base stations that provide access to the wireless network 100 and includes one or more processors 150, one or more memories 155, one or more network interfaces (N/W I/F(s)) 161, and one or more transceivers 160 interconnected through one or more buses 157. The one or more transceivers 160 are connected to one or more antennas 158. The one or more memories 155 include computer program code 153. The one or more memories 155 and the computer program code 153 are configured to, with the one or more processors 150, cause the eNB 145 to perform one or more of the operations as described herein. The one or more network interfaces 161 communicate over a network such as the networks 170 and 131. Two or more eNBs 140 communicate using, e.g., network 170. The network 170 may be wired or wireless or both and may implement, e.g., an X2 interface.

The wireless network 100 may include a network control element (NCE) 145 that may include MME/SGW functionality, and which provides connectivity with a further network, such as a telephone network and/or a data communications network (e.g., the Internet). The eNB 140 is coupled via a network 131 to the NCE 145. Although not shown, the eNB 140-2 may also connect to the network 131. The network 131 may be implemented as, e.g., an S1 interface. The NCE 145 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE 145 to perform one or more operations.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The processors 120, 150, and 175 may be of any type suitable to the local technical environment, and may include one or more of general purpose computers, special purpose computers, microprocessors, digital signal processors (DSPs) and processors based on a multi-core processor architecture, as non-limiting examples.

In general, the various embodiments of the user equipment 110 can include, but are not limited to, cellular telephones such as smart phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

FIGS. 3B and 3C provide examples of a Pcell 10 and an Scell 12. In the example of FIG. 3B, the Pcell 10 is, e.g., a macro cell formed by eNB 140-1 and the Scell 12 is an underlying cell (e.g., having a smaller coverage area partially or completely within a coverage area of the Pcell 10) formed by eNB 140-2. FIG. 3C is another example where the Pcell and Scell coexist over about the same coverage area. These may be created by a single eNB 140, e.g., with two separate sets of antennas and other hardware, or by two collocated eNBs 140-1 and 140-2.

In exemplary embodiments of the instant invention, one can assume that the control signals are sent through the licensed cellular band and only data through unlicensed band for the more reliability. This assumption is made below, but is not necessary. FIG. 4 provides examples of licensed and unlicensed band communication scenarios. In this example, the subframe 410 on the licensed band (e.g., on the PCC) contains control 405 and data 407 regions and at least the control region 405 relates to the transmission to be performed on the unlicensed band (e.g., SCC). Instead of sensing the channel periodically, the unlicensed band will be sensed continuously, such as shown by the "sensing by Rx 435", but a preamble 450-1 is added to the data payload in the subframe 420-1. The transmitting (Tx) device performs sensing 440 prior to transmission (e.g., listen before talk). The preamble period can be as short as those periods defined for WiFi. Therefore, the LTE data payload (including the preamble 450-1 and the data 460) looks like WiFi data payloads.

Also shown is another possibility, shown by subframe 420-2, wherein a transmitter performs sensing 440, is to use a preamble 450-2 and then perform a transmission burst 470, where each TX (e.g., each data portion 460-1, 460-2 or 460-3) can be to a different user (i.e., different UEs 110). The preamble 450-2 could contain unique sets of data, each set indicating one of the different users. That is, multiple unique codes could be transmitted (e.g., possibly sequentially) in a single preamble, but then additional signaling is needed to allow the receiving devices to look for multiple codes, and the number of which may need to be known a priori. Furthermore, if data for multiple receiving devices is multiplexed (whether in time or frequency) in a single transmission/packet, information on the multiplexing (e.g., "scheduling" information) should be included to allow the receiving devices to correctly decode their respective packets 460-1, 460-2, or 460-3. If such "scheduling" information is included, then a single group-code (corresponding to all destination devices for the current transmission) could still be used in the preamble 450-2, rather than multiple codes.

With this method, the flexibility of sending and receiving signals whenever possible is achieved. In this way, earlier synchronization signals of LTE (PSS and SSS) can be left out. Additionally, operation can be more energy efficient and this method results in gain control.

In the uplink, the preamble 450 can also be used for non-synchronized contention-based access. For instance, Machine-Type Communications (MTC) devices (also called M2M devices) can directly transmit uplink data without having to undergo a random access procedure. This can significantly reduce the overhead and latency for MTC devices that transmit small amounts of data infrequently.

It is to be noted that the "unlicensed band" shown in FIG. 4 is merely one possible example of a band the usage of which requires coexistence with other (e.g., possible) users of the band. In other words, multiple users may (attempt to) use the band at the same time. There are, however, other types of bands the usage of which requires coexistence with other users of the band. Consider the following as examples of these bands:

1) Lightly-licensed: Operators must register with FCC (Federal Communication Commission) in order to use this band, but generally do not need to purchase a license (or purchase/register for a nominal fee). Multiple operators in the same region may share the spectrum.

2) License-exempt or unlicensed: Operators can operate without a license but must use certified equipment and comply with coexistence requirements. Operators do not have exclusive use of the spectrum.

3) Secondary usage of the licensed band: Temporary usage of a licensed spectrum by a secondary user. For example, public safety may own some spectrum and allow commercial operators to use the spectrum when free, but will reclaim the spectrum as needed.

4) TV (TeleVision) white space: Spectrum allocated to TV broadcasting but not used locally. This is similar to secondary usage of the licensed band in that the primary user can claim the spectrum later (but the time scale for reclamation can be very long).

Use of the band therefore potentially requires coexistence with other users of the band. That is, For 1 & 2, other users will share the band as no one has exclusive use. For 3 & 4, the following two scenarios may exist: A. Licensed users reclaim the spectrum, in which case all other users will have to leave (no coexistence needed); and 2. Licensed users are not using the spectrum, and all other users then can use the spectrum but must coexist with each other.

It should be noted, however, for D2D communications, these communications may also occur using licensed bands. For instance, a radio network (e.g., an eNB) could schedule a D2D communication for two or more UEs over an LTE band.

A description is now presented of exemplary embodiments that describe how to achieve non-deterministic timing, e.g., on an Scell 12 that uses the unlicensed band. Normally, LTE timing is deterministic, following discrete time steps (e.g., 1 ms, millisecond, subframes). As discussed in previous sections, this kind of deterministic timing is inefficient on the unlicensed band. WLAN systems may take the channel into use after a minimal time after any transmit burst (in the order of a minimum of 15 microseconds), and should LTE use discrete time steps, an LTE device would not get access to the unlicensed band so easily, especially in a congested channel.

Typically, because of baseband processing delay, LTE DL sub-frames are buffered into memory, and processed from there. The UE knows the timing from PSS/SSS, which are present in the LTE frame; slight time misalignment is tolerated because of cyclic prefix. In case of opportunistic channel access with non-deterministic timing, the PSS/SSS would have to be present in all transmitted sub-frames. Then, the UE would look for the PSS/SSS within at least a sub-frame size window, which means in practice that at least two sub-frames would need to be buffered in memory. Adding baseband processing delay, the buffer size would have to be increased further. This solution may be feasible, but consumes power (because the PSS/SSS detection must run continuously) and adds UE implementation cost due to memory requirements.

Unlike LTE, WLAN is not centrally managed, and Access Points (AP) and Stations (STA, corresponding to user equipment) may locate anywhere. Typically, all devices transmit at maximum output power, to maximize the SNR (and hence allow maximum bit rate) at the receive end, and to overshadow any hidden nodes. This means that successive receive bursts may be at any power level, e.g., if the transmissions come from a distant AP and an adjacent STA. The specified input power level range is in the order of 100 dB.

Because of the extreme dynamic range and the very short inter-burst timing, WLAN receivers use a fast automatic gain control (AGC) scheme. The complete data part of the burst must fit within an AGC input window: if the signal level at the AGC is too high, clipping will occur, and if the signal level is too low, quantization noise will degrade SNR. The receiver adjusts the analog gain continuously, and freezes the gain when a burst is detected (e.g., adjusting analog gain steps during a receive burst would mean glitches, which may be difficult to track).

Figure 5:
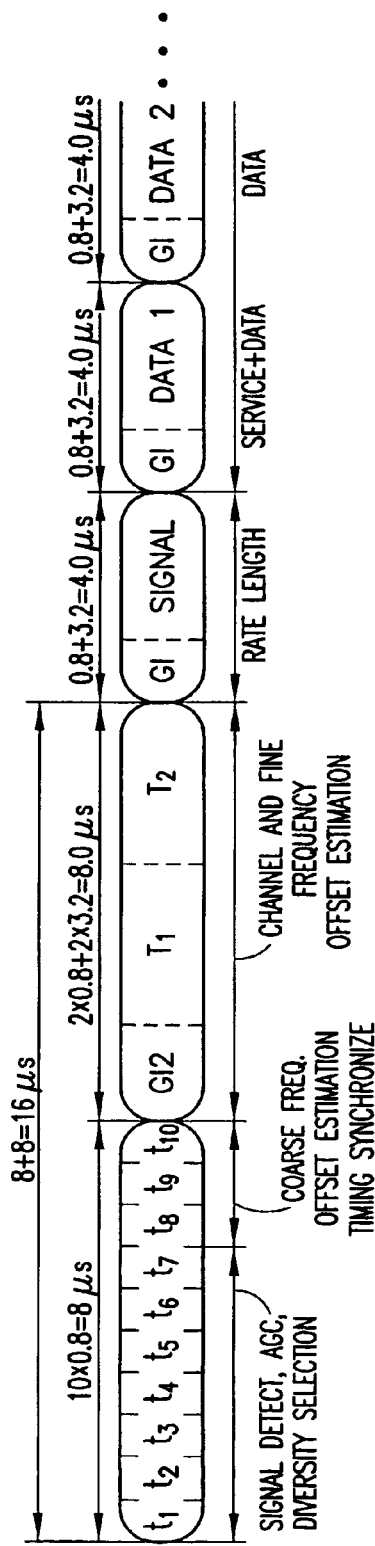
FIG. 5 is an example of 802.11 OFDM PHY training structure.

FIG. 5 shows the WLAN transmission training structure. See also FIG. 17-4, "OFDM training structure", in section 17.3.3 (entitled "PLCP preamble (SYNC)") of IEEE Std 802.11 ™-2007, entitled "IEEE Standard for Information technology—Telecommunications and information exchange between systems—Local and metropolitan area networks—Specific requirements: Part 11: Wireless LAN Medium Access Control (MAC) and Physical Layer (PHY) Specifications". The first eight microseconds of the burst are very simple short symbols, which are used for signal detection (auto and cross correlation), AGC, diversity selection, coarse frequency estimation (as the clocks of the devices are not synchronized, successive bursts may have a large frequency variation), and timing synchronization. The first about five microseconds are used for AGC, after which the analog gain is frozen. For channel estimation, two OFDM symbols are provided, and after that, each symbol provides pilot subcarriers for phase and amplitude tracking.

A WLAN receiver could in principle work also similarly as LTE, i.e., the receiver would buffer the input samples and post-process the data frames from memory. But this would require a receiver with impractically large dynamic range, because the successive bursts may vary widely in power level. For the same reason, it is not expected that an LTE UE to be able to work in a conventional fashion, when receiving on unlicensed spectrum: if there are a mix of WLAN devices and LTE eNBs transmitting, the LTE UE receiver would have to adjust analog gain very much like a WLAN receiver, i.e., at the onset of each burst separately. If the UE would buffer more than two sub-frames worth of signal, out of which one sub-frame is the wanted eNB transmission, a significant part of the samples would be likely clipped, or dominated by ADC quantization noise. If the UE would adjust gain during the buffering, it could be that the gain is adjusted during the wanted eNB transmission, which would create a glitch and could ruin the reception.

This problem may be partly alleviated by the UE remembering the wanted eNB signal power level between transmitted sub-frames, and not adjusting the gain based on any other transmissions. Fading channel performance would be worse than regular LTE because of less measurement points, but the solution could be feasible. There could still be problems when, e.g., setting the gain to maximum value because of a distant eNB and operating near the sensitivity level, with an adjacent high-power WLAN STA (or even the WLAN transmitter within the mobile phone). In these cases, the power tolerance of the front-end components could need to be increased, and the memory effects on the amplifiers could ruin the wanted weak signal after strong transmissions. Another problem would be that if the gain is not set at maximum the sensitivity will degrade, and the UE will not be able to monitor the channel properly (for e.g. listen-before-talk, or making proper mobility measurements).

Therefore it is proposed in an exemplary embodiment that the LTE UE on unlicensed band use a fast AGC and adjust gain at the start of all transmit bursts. For an LTE signal, this could possibly be done during the cyclic prefix, or there could be a specific preamble.

Inserting a preamble before the actual signal (i.e., data) portion has some benefits. Typically, the (fixed) preamble sequences may be detected much more easily, than the (variable) data symbols. The UE would not have to buffer the samples before a preamble is detected, buffering for a single sub-frame would be enough, and the burst detection is simpler than for example detecting the PSS/SSS from within the sub-frame. If the preamble properties are good enough for time and frequency synchronization, the PSS/SSS could be left out. The preamble can also contain a small amount of data, e.g. a few orthogonal codes, which could be used to determine, e.g., which eNB is transmitting, similar information as is included in the regular synchronization signals.

With the discussed arrangements on gain control, preamble, and the like, the UE is able to correctly receive a transmit burst, e.g. a subframe 420, from the eNB, at any time when the unlicensed channel is configured. Considering that PDCCH spans over the complete channel, and that also narrowband sporadic interference is typical on the unlicensed bands (e.g. Bluetooth), it may be wise to move the control information to the primary carrier. This means that PDCCH information on Pcell is used to decode resource allocation on the Scell. For instance, in FIG. 4, the control region 405 could be PDCCH and used to decode resource allocation on the Scell. Conventional cross-carrier scheduling typically cannot however be used, as it is not known exactly when the Scell transmissions are possible, and the reaction time from making the transmit decision on the unlicensed band to actually transmitting must be in the order of microseconds (i.e., there is no time to update the Pcell control fields).

To counter these problems, relative pointers to data resources could be used. That is, because it is difficult to ensure on Pcell during subframe n, that subframe n+4 can be transmitted on Scell, the eNB could use a relative pointer indicating on a Pcell resource allocation "decode these resources in the next transmitted subframe on Scell". Furthermore, if all the transmitted subframes contain a sequence number, the scheduling could use that.

In the uplink, the preamble can also be used for non-synchronized contention-based access. For instance, Machine-Type Communications (MTC) devices do not have to undergo random access procedure but instead transmit their uplink data directly. In this case, MTC devices that are unsynchronized in the uplink can then transmit a data packet using a modified PUSCH format within the assigned resource blocks based on rough timing obtained in the downlink. Acknowledge and contention resolution is done using a specialized grant whose content is the UE ID of the MTC device that was correctly decoded.

The procedure is described in detail as in the following non-limiting example. This example refers in part to FIG. 6, which an example of an uplink access procedure for an access on an unlicensed band in an exemplary embodiment.

Figure 6:
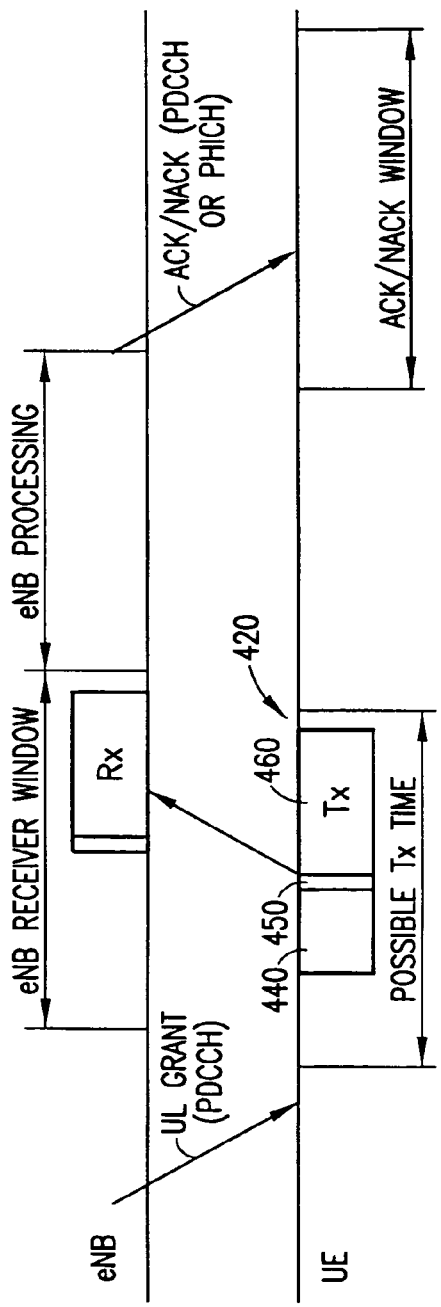
FIG. 6 is an example of an uplink access procedure for an access on an unlicensed band in an exemplary embodiment.

1. A special grant for unsynchronized uplink access is given. This is shown in FIG. 6 as "UL grant (PDCCH)" to indicate the UL grant is provided on the PDCCH (e.g., the control region 405 of FIG. 4). The grant gives the resource block (RB) allocation and spans k subframes (e.g., provides a time interval that spans k subframes). MCS level could also be given in the grant, but can be optional. In this case, several predefined MCS levels can be configured. The UE 110 will then select one and the eNB 140 will blindly detect the MCS level used. This grant is addressed, e.g., to a unique RNTI reserved for unsynchronized access. Since the uplink assignment is dynamic, the eNB 140 can assign unused PUSCH RBs for this and adjust the grant frequency based on system load. One or more RNTIs can be reserved for this purpose. When multiple RNTIs are reserved, MTC devices may be divided into different groups with each group assigned a particular RNTI.

Figure 7:
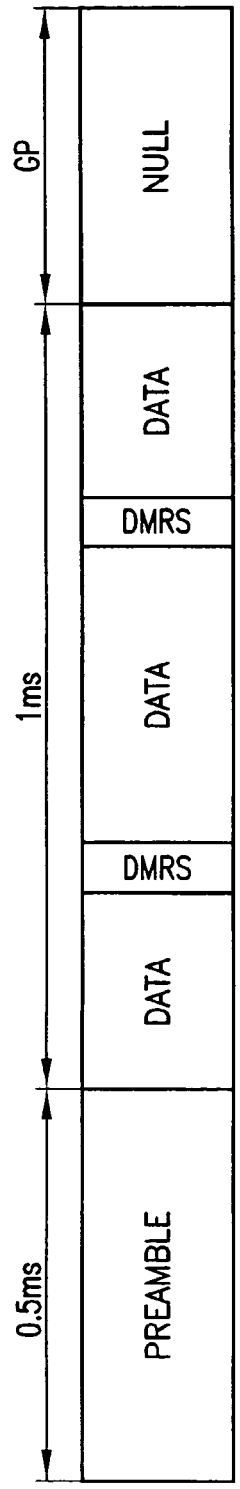
FIG. 7 shows an exemplary modified PUSCH structure.

2. MTC devices (e.g., UEs 110) with pending uplink transmission will decide whether to use unsynchronized uplink access or undergo traditional random access procedure based on the amount of data, time since last transmission and possibly past successes using unsynchronized uplink access. If unsynchronized uplink access is chosen, the device will blindly detect and decode the PDCCH using the reserved RNTIs. When a grant is detected, the UE will transmit uplink data in an unsynchronized manner using a special PUSCH format. The UE 110 measures the change in sensing 440 time period. The special PUSCH format is comprised of a preamble 450 followed by a regular PUSCH subframe (e.g., 460 in this example), then guard period (not shown in FIG. 6, but a guard period, GP, is shown in FIG. 7). The UE will randomly select a preamble sequence, DMRS sequence and cyclic shift when transmitting the uplink data. This allows the eNB 140 the possibility of detecting and decoding multiple uplink transmissions within the same subframes. Within the data packet, UE will also send its UE ID as a unique identifier. A guard period is used at the end of the packet to prevent interference to the next subframe.

3. When the eNB 140 detects the uplink transmission (in the "eNB receiver window" period in FIG. 6), the eNB 140 tries to decode the message (e.g., in the "eNB processing" time interval shown in FIG. 6). If successful, the eNB 140 acknowledges the transmission via, e.g., an ACK/NACK on the PDCCH (or PHICH). In this case, a special acknowledgement is formed where the eNB echoes back the UE ID from the data packet that the UE 110 can decode. This serves as both acknowledgement and contention resolution.

4. If an MTC device does not receive an acknowledgement (e.g., during the ACK/NACK window time period shown in FIG. 6), the device performs a random back-off before attempting to transmit the data via unsynchronized access again. Alternately, the device may elect to undergo a traditional RACH procedure. MTC devices that receive an acknowledgement will go back to idle mode if there is no pending data. Otherwise the device attempts unsynchronized access again.

An exemplary modified PUSCH structure is shown in FIG. 7. The DMRS is based on the uplink assignment by the eNB 140 with the UE 110 randomly selecting the cyclic shift to allow the eNB 140 a chance to detect more than one UE 110 in case of collision. This example includes a Guard Period (GP), e.g., of 0.5 ms.

In another exemplary embodiment, preamble length is RRC-configured based on one or more of the following: Tx power, pathloss to receiver (e.g., a UE 110), transmission bandwidth, or transmission mode (similar to those defined in 3GPP specifications for LTE systems; scenarios with e.g., transmission diversity, open/closed loop channel feedback). For instance, an increase in transmission (Tx) power can correspond to a decrease in preamble length. If pathloss increases, the preamble length can increase. Smaller transmission bandwidth can correspond to shorter preamble length. An open loop transmission may use a larger preamble than a closed loop transmission.

A short preamble may be generated by puncturing, e.g., the first OFDM symbol of the subframe 420. This is possible using the extension carrier (e.g., SCC on the unlicensed band). That is, the first three OFDM symbols are dedicated for control information, PDCCH, which has to be sent in PCell. In SCell (i.e., extension carrier) there is no need to send control information and therefore the first OFDM symbol (e.g., or a few OFDM symbols) of the subframe 420 may be punctured without risking loss of control information. A long preamble may span several symbols and be appended to the beginning of the subframe.

In addition to the above description of possible construction of the preamble 450, the preamble 450 may be a unique sequence for each eNB/UE combination (e.g., as much as possible) and may be constructed using the following non-limiting examples:

1) An orthogonal sequence initialized by C-RNTI (e.g., a temporary or other ID of a UE) and/or PCI (Physical Cell ID);

2) A scrambling sequence initialized by C-RNTI (e.g., a temporary or other ID of a UE) and/or PCI;

3) A Zadoff-Chu sequence with a base sequence and a shift initialized by C-RNTI (e.g., a temporary or other ID of a UE) and/or PCI.

Figure 8:
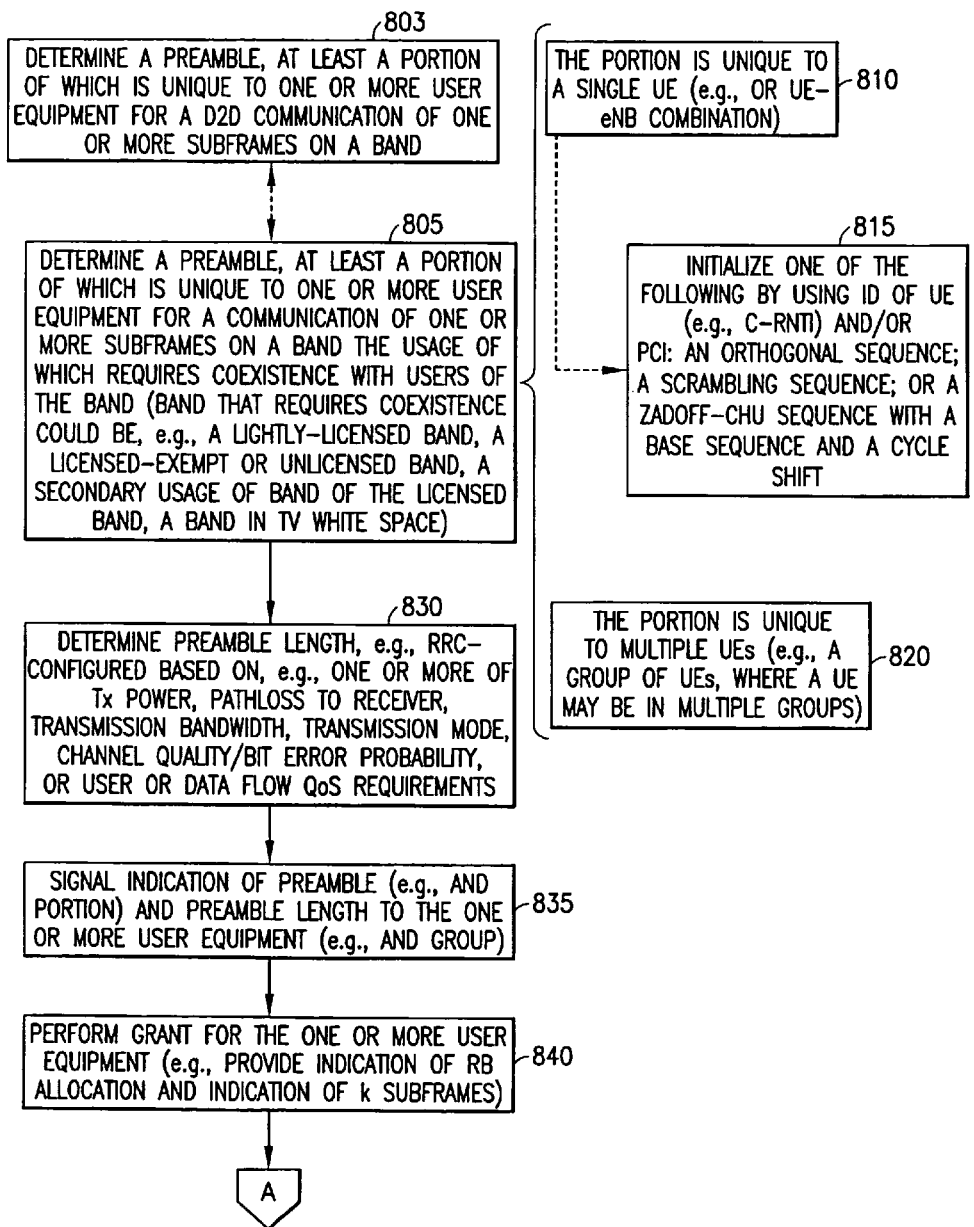
FIG. 8 is a block diagram of a flowchart performed by a base station for using unique preambles to improve LTE usage on unlicensed bands.
Figure 8:
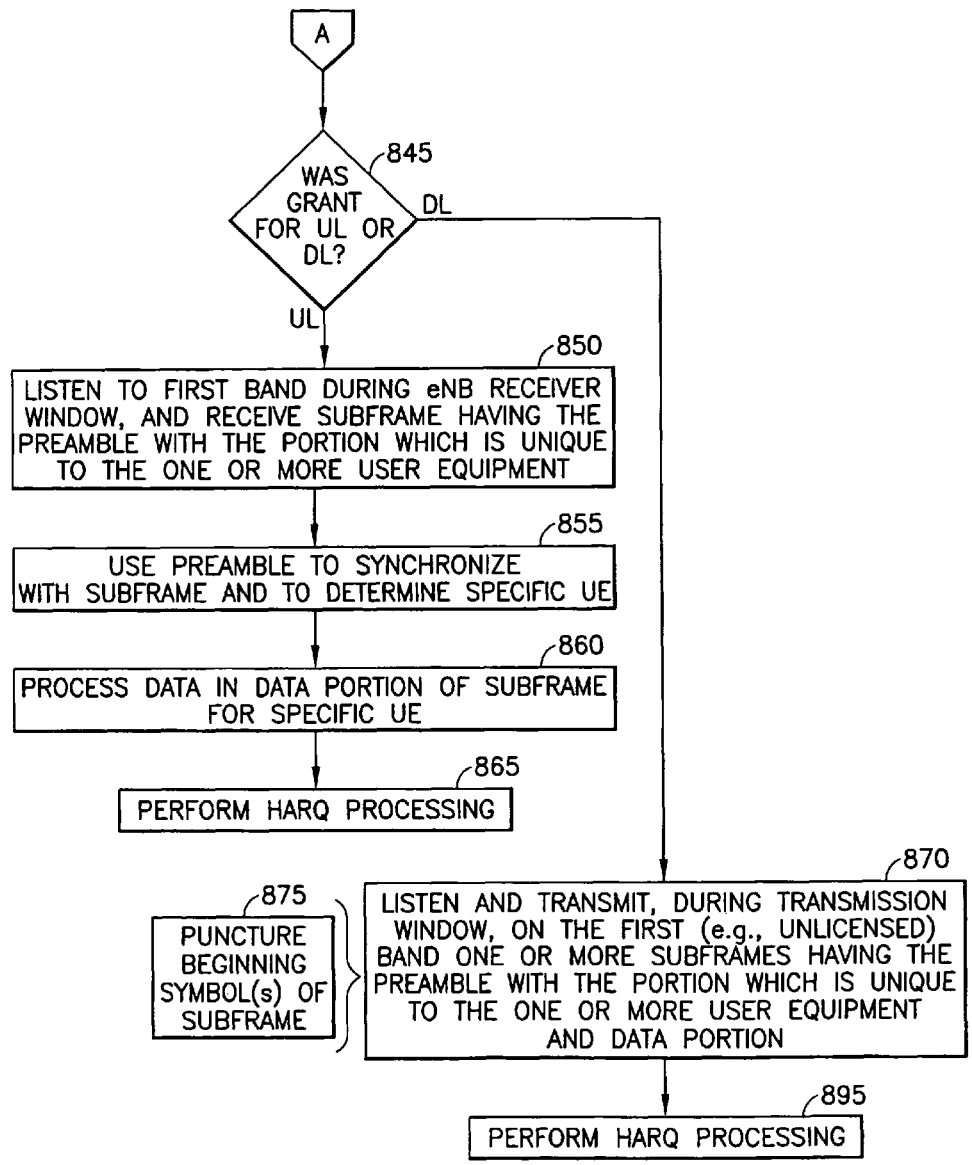
Figure 9:
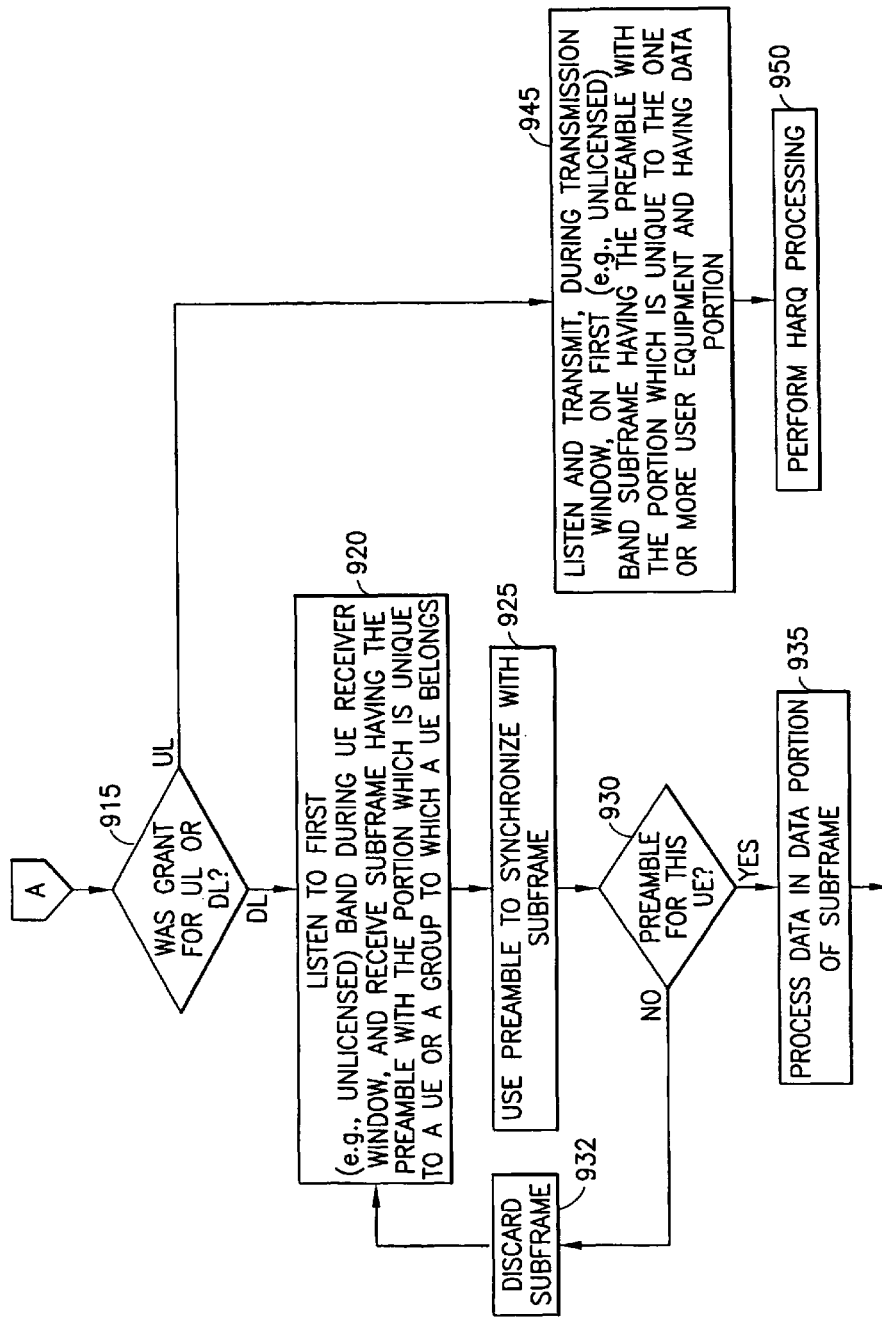
FIG. 9 is a block diagram of a flowchart performed by a user equipment for using unique preambles to improve LTE usage on unlicensed bands.
Figure 10:
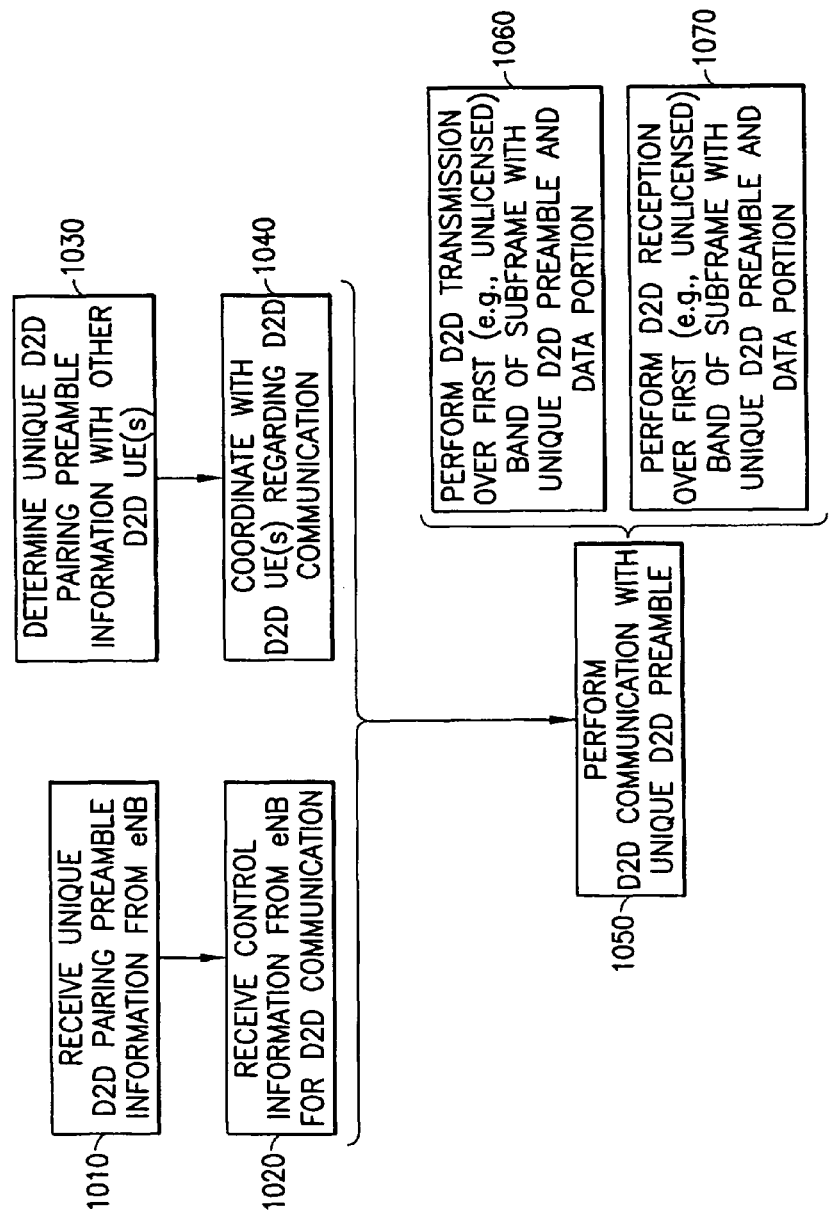
FIG. 10 is a block diagram of a flowchart performed by a user equipment for using unique preambles to improve LTE usage on (e.g., unlicensed) bands specifically with regard to D2D communications.

FIGS. 8 and 9 are in general related to license-exempt and M2M communications, while FIG. 10 is in general related to D2D communications. However, these should not be strictly separated as such. For example, the techniques described above and in reference to FIG. 8 for reception and processing of data may be used in FIG. 10, as perhaps could puncturing the first symbol(s) of the data portion 460.

Turning now to FIG. 8, a block diagram is shown of a flowchart performed by a base station for using unique preambles to improve LTE usage on unlicensed bands. The blocks in FIG. 8 can be method operations, or operations caused by computer program code borne on a computer-readable storage medium. The blocks may further be operations performed by software (e.g., computer program code 153 executed by the one or more processors 150), by hardware such as an integrated circuit designed to perform the operations, or come combination thereof. For clarity, the base station will be referred to as the eNB 140.

One of blocks 803 or 805 is performed. Block 803 concerns D2D communications and the corresponding UE actions are shown in FIG. 10. In block 803, Determine a preamble, at least a portion of which is unique to one or more user equipment for a D2D communication of one or more subframes on a band. The band could be the bands that require coexistence or could be a licensed (e.g., LTE) band. Some or all of blocks 810, 815, 820, 830, 835, and 840 also may be used for D2D communications. These blocks are described below.

In block 805, the eNB 140 determines a preamble. As described above, at least a portion of the preamble is unique to one or more user equipment for a communication of one or more subframes on a band that requires coexistence with possible users of the band. As described above, the frequency band is a band the usage of which requires coexistence with possible users of the band. Such a band could be, e.g., a lightly-licensed band, a licensed-exempt or unlicensed band, a secondary usage of a band of the licensed band, a band in TV white space. As indicated in block 810, the portion may be unique to a single UE (e.g., or a UE-eNB combination). Such unique portion may be created, e.g., by (block 815) initializing one of the following by using an ID of the UE (e.g., C-RNTI, MAC address) and/or PCI: an orthogonal sequence; a scrambling sequence; or a Zadoff-Chu sequence with a base sequence and a cyclic shift. The PCI is a PCI of a cell (e.g., 10 or 12) to which the UE 110 is attached.

Such portion may also be unique to multiple UEs (e.g., a group of UEs, where a UE may be in multiple groups). See block 820. In an example, there would be a unique code corresponding to each group of UEs. Thus, multiple codes would be used if there are multiple groups of UEs configured and presumably the network would ensure that the codes are unique. A UE could belong to multiple groups. Just to clarify, the preamble 450 would contain just a single code since a device would transmit to other devices in a single group (a union of multiple groups would be another group by itself and there would be a separate code associated with this group). This device transmitting to other devices could be a device, i.e., an UE in multi-hop scenario, and not necessarily an eNB. The device can broadcast some information to a group of devices. In another exemplary embodiment, as describe above in reference to FIG. 4 and subframe 420-2, multiple codes corresponding to multiple UEs (or multiple groups) could be included in the preamble 450 (e.g., 450-2 of FIG. 4), if additional scheduling information is also communicated to allow UEs to allow the UEs to look for multiple codes and to allow the UEs to correctly decode their respective packets 460-1, 460-2, or 460-3. If such scheduling information is included, then a single group-code (corresponding to all destination devices for the current transmission) could still be used in the preamble 450-2, rather than multiple codes.

In block 830, the eNB 140 optionally determines the preamble length. As indicated above, the preamble length could be RRC-configured based on, e.g., one or more of Tx power, pathloss to receiver, transmission bandwidth, transmission mode, one or both of channel quality or bit error probability (e.g., bit error rate, block error rate, and the like), or one or both of user or data flow Quality-of-Service (QoS) requirements (e.g., packet loss, latency, jitter, and the like).

In block 835, the eNB 140 signals one or more indications of preamble (e.g., and portion) and preamble length to the one or more user equipment. Note that if the portion corresponds to a group, an indication of the group should also be signaled. In block 840, the eNB 140 performs one or more grants for the one or more user equipment (e.g., to provide an indication of RB allocation and an indication of k subframes to be used by the UE(s) for UL or DL). It is noted that blocks 835 and 840 may be performed using a control channel (e.g., PDCCH) between the eNB 140 and the one or more UEs 110, e.g., using a PCC on the licensed band as shown in FIG. 4.

In block 845, if a grant was for an UL, the eNB 140 proceeds to block 850; if the grant was to a DL, the eNB 140 proceeds to block 870. Regarding a grouping scenario where the eNB is transmitting (DL) to a group of UEs or receiving (UL) from a group of UEs, grouping is mostly a DL concept. However, there can be an UL grouping concept, but the UE will have to put its ID (or a unique ID) inside a data packet so the eNB can determine the relevant UE. For UL, the eNB 140 listens (block 850) to the first band (e.g., unlicensed band) during eNB receiver window, and receives a subframe having the preamble with the portion which is unique to the one or more user equipment. In block 855, the eNB 140 uses the preamble to synchronize with subframe and to determine a specific UE. In block 860, the eNB 140 processes data in the data portion of the subframe for the specific UE. In block 865, the eNB 140 performs HARQ processing (e.g., as shown in FIG. 6, the eNB 140 can send an ACK or a NACK).

In block 870, if the grant was for DL, the eNB 140 in block 870 listens and transmits, during transmission window, on the first (e.g., unlicensed band) one or more subframes having the preamble with the portion which is unique to the one or more user equipment and data portion. In general, there may be one subframe used, e.g., to communicate a packet. As stated above, one option is to puncture (block 875) the first symbol(s) of the subframe 420 for this example. That is, the first symbol(s) of data are overwritten by the preamble 450. However, a packet may span more than one subframe. For packets that span more than one subframe, the first symbol(s) of a beginning subframe of multiple subframes making up the packet or the first symbol(s) of multiple subframes making up the packet may be used for the preamble. That is, regarding whether a preamble is needed at the start of each subframe for a transmission consisting of multiple (consecutive) subframes, then a preamble is needed at the start of only the first subframe and not the subsequent subframes. The receiver can achieve AGC and synchronization with this preamble and would not need a preamble again for the remainder of the transmission, even when multiple subframes follow. These packets (spanning one or more subframes) will typically contain data, but may also contain control information. In block 895, the eNB 140 performs HARQ processing. That is, the eNB 140 can receive an ACK or a NACK and then take appropriate action.

Referring now to FIG. 9, a block diagram is shown of a flowchart performed by a user equipment 110 for using unique preambles to improve LTE usage on unlicensed bands. The blocks in FIG. 9 can be method operations, or operations caused by computer program code borne on a computer-readable storage medium. The blocks may further be operations performed by software (e.g., computer program code 123 executed by the one or more processors 120), by hardware such as an integrated circuit designed to perform the operations, or come combination thereof.

In block 905, the UE 110 receives signaling of an indication of the preamble (e.g., and portion) and, if provided, an indication of the preamble length. If the portion also corresponds to a group. the UE 110 should also receive an indication of the group. In block 910, the UE 110 receives a grant (e.g., providing indication of RB allocation and indication of k subframes).

Block 915 is a representation that the grant could be for UL or DL. If the grant was for DL, the UE 110 proceeds to block 920. If the grant was for UL, the UE 110 proceeds to block 945.

For DL, the UE 110 listens to the first (e.g., unlicensed) band, e.g., during a UE receiver window, and receives a subframe 420 having the preamble 450 with the portion which is unique to a UE or to a group to which a UE belongs. See block 920. As described above, the first band is a frequency band the usage of which requires coexistence with possible users of the band and the first band could be, e.g., a lightly-licensed band, a licensed-exempt or unlicensed band, a secondary usage of a band of the licensed band, or a band in TV white space. Note that the preamble 450 (and the corresponding subframe 420) may not be meant for the UE 110 performing FIG. 9. For instance, in a group scenario, if a UE is not part of the group, then the subframe is not meant for the UE, and, e.g., the UE should not have the unique portion of the preamble corresponding to the group. In block 925, the UE 110 uses the preamble to synchronize with the subframe.

Regarding synchronization and the AGC, for any receiver, the problem lies in the receive signal being inside the dynamic range. On the low side, this is dominated by thermal and receiver noise. On the high side, typically ADC (analog to digital converter) maximum input. Because any analog gain step produces a glitch in the signal (e.g., settling takes some time), gain control can typically be adjusted in between signal bursts. For LTE, this would be at the subframe boundaries (i.e., no useful signal there), and for WLAN at the burst start.

The analog gain must be set so that for the complete burst the signal will fit in the dynamic range. For LTE, the UE must be prepared for fast fading, i.e., allocate some margin both up and down. But the receiver has the complete previous subframe to make the measurement, i.e., the receiver may sample quite a few reference symbols and the like to make the decision. For the LTE receiver, the receive signal is relatively constant because the signal originates from the base station(s) which transmit continuously (or thereabouts).

For WLAN, successive transmissions may come from any device or access point, be it 10 cm (centimeters) or 50 meters away. The interframe spacing is in the order of 16 microseconds, and the receiver must be prepared for any receive power level. Looking at the training/preamble structure, the receiver has just a couple of microseconds to do the AGC. Compared to LTE, the WLAN AGC loop has to be very fast.

Consequently, if the LTE UE is configured to operate in the unlicensed band, and there are other unlicensed devices transmitting, the UE could at any time receive a strong signal from a device right next to the UE.

Assuming the LTE eNB is not very close, the UE should have high analog gain to be able to receive from the eNB. If the UE does not have a "fast AGC", any transmission from an adjacent device could harm the UE, or at least drive the UE to saturation which could take some time to recover from. The LTE UE operating in the unlicensed band therefore should have this fast AGC to protect itself, and to be able to adjust quickly to the wanted eNB transmission, when the transmission starts.

To facilitate the coexistence with legacy systems as well as possible, it would make sense for the LTE UE to be able to receive, e.g., WLAN frames, to better know when the other systems need protecting. All WLAN frames include duration information which is in the PHY header, as well as virtual transmission exchange duration in the MAC header. Without a fast AGC scheme, the UE is not able to receive these legacy system transmissions.

In block 930, it is determined if the preamble was meant for this UE 110. If the preamble is not meant for this UE 110 (e.g., if the unique code does not correspond to a unique code for the UE or for a group to which the UE belongs), block 930=No, and the UE 110 discards the subframe (block 932) and then proceed to block 920.

If the preamble is meant for this UE 110 (e.g., if the unique code corresponds to a unique code for the UE or for a group to which the UE belongs), block 930=Yes, and the UE 110 processes data in the data portion 460 of the subframe 420 (block 935) and performs HARQ processing (block 940) (e.g., sends an ACK or a NACK as appropriate).

It should be noted that FIG. 9 can also include an error mode where the UE 110 does not receive a subframe meant for the UE 110, even though the DL grant indicated the UE 110 should receive such a subframe. Such processing could be implemented but is not shown for simplicity.

If the grant was for an UL, the UE 110 in block 945 listens and transmits when appropriate, during a transmission window (see, e.g., "Possible Tx time" of FIG. 6), on the first (e.g., unlicensed band) one or more subframes having the preamble 450 with the portion which is unique to the one or more user equipment and having a data portion 460. In general, there may be one subframe used, e.g., to communicate a packet. As stated above, one option is to puncture (block 875) the first symbol(s) of the subframe 420 for this example. That is, the first symbol(s) of data are overwritten by the preamble 450. However, a packet may span more than one subframe. For packets that span more than one subframe, the first symbol(s) of a beginning subframe of multiple subframes making up the packet or the first symbol(s) of multiple subframes making up the packet may be used for the preamble. These packets will typically contain data, but may also contain control information. The portion may be specific to the UE 110 or to a group of UEs 110 to which the UE 110 belongs. In block 950, the UE performs HARQ processing (e.g., receives an ACK or a NACK and takes appropriate action).

With reference to FIG. 10, a block diagram is shown of a flowchart performed by a user equipment for using unique preambles to improve LTE usage on unlicensed bands specifically with regard to D2D communications. The blocks in FIG. 10 can be method operations, or operations caused by computer program code borne on a computer-readable storage medium. The blocks may further be operations performed by software (e.g., computer program code 123 executed by the one or more processors 120), by hardware such as an integrated circuit designed to perform the operations, or come combination thereof.

For D2D communications (e.g., using link 112, see FIG. 2) a unique preamble pairing is used for D2D identification. D2D UEs only need to detect the preamble to see if the data packet is for the D2D UE or not. It is noted that a D2D communication is a communication directly between two UEs 110, without passing through a base station. It is noted that a device discovery procedure may be performed to determine whether there are other devices suitable for a D2D communication. The device discovery procedure may take place between a UE and a base station. However, once a device (or devices) has (have) been identified, the communication can be performed either without involving base stations or communications through base stations. The D2D UEs may receive the unique preamble 450 (e.g., or an indication thereof) from an eNB 140. See block 1010. The D2D UE may also receive (block 1020) control information from the eNB 140 for the D2D communication. For instance, the eNB 140 may provide a schedule of possible subframes over which the D2D UE 110 may transmit.

Alternatively or in addition, the D2D UEs may communicate between themselves and determine the unique preamble 450. See block 1030. The D2D UEs may also coordinate amongst themselves regarding the D2D communication (e.g., which D2D should transmit during what time period). See block 1040. However, this may entail perhaps some high level signaling or algorithm (e.g., between a D2D UE and a base station) may be needed to define a unique preamble for different purposes such as a D2D communication.

The preamble 450 could be unique per pair of D2D UEs 110 (i.e., each D2D UE 110 in a pair uses the same preamble 450), or each D2D UE 110 in a pair could use a unique preamble 450. The unique preamble 450 for D2D communication may also be valid for multiple D2D UEs 110, e.g., for a one-to-many communication.

In block 1050, the D2D UE 110 performs the D2D communication with unique D2D preamble. That is, in block 1060, a UE 110 performs a D2D transmission over the first (e.g., unlicensed, although could be licensed or any of the bands described above) band of a subframe with the unique D2D preamble and data portion. As described above, the first band is a frequency band that needs coexistence with another band and the first band could be, e.g., a lightly-licensed band, a licensed-exempt or unlicensed band, a secondary usage of a band of the licensed band, or a band in TV white space. Listen-before-talk may be used for the transmission. In block 1070, another UE 110 performs a D2D reception over the first (e.g., unlicensed) band of subframe with unique D2D preamble and data portion. For the receiving D2D UE 110, this UE may perform the blocks 920, 925, 930, 935, and 940 as shown above in order to receive and process (or discard) the subframe.

Embodiments of the present invention may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 3A. A computer-readable medium may comprise a computer-readable storage medium (e.g., memory 125, 155, 195 or other device) that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method, comprising:
   determining a synchronization preamble, at least a portion of which is unique to one or more user equipment for a one-to-many device-to-device communication of one or more subframes on a band, wherein the portion is received from a base station prior to performing the one-to-many device-to-device communication and determining the preamble further comprises constructing the portion using a Zadoff-Chu sequence with a base sequence initialized by one or both of an identification assigned to at least one of the user equipment or a physical cell identification of a cell corresponding to the base station; and
   performing the one-to-many device-to-device communication of the one or more subframes comprising the preamble on the band, wherein one of the user equipment performs the device-to-device communication with another one of the user equipment.

2. The method of claim 1, wherein the portion is unique per pair of the user equipment performing the one-to-many device-to-device communication.

3. The method of claim 1, wherein an indication of the portion is determined via one or more communications between the user equipment to perform the one-to-many device-to-device communication and is determined prior to the performing of the one-to-many device-to-device communication.

4. The method of claim 1, wherein determining the preamble further comprises constructing the portion using an orthogonal sequence initialized by one or both of the identification assigned to the single user equipment or the physical cell identification of the cell corresponding to the base station.

5. The method of claim 1, wherein determining the preamble further comprises constructing the portion using a scrambling sequence initialized by one or both of the identification assigned to the single user equipment or the physical cell identification of the cell corresponding to the base station.

6. The method of claim 1, wherein the portion corresponds to multiple of the user equipment belonging to a group.

7. The method of claim 6, wherein determining further comprises receiving an indication of the preamble from the base station and determining the preamble using the indication.

8. The method of claim 6, wherein:
   a selected one of the user equipment is a member of the group;
   the selected user equipment determines the preamble and the corresponding portion by receiving one or more indications of the preamble and of the group from a base station;
   performing the one-to-many device-to-device communication further comprises the selected user equipment receiving the one or more subframes on the band; and
   the method further comprises:
   responsive to a determination the portion corresponds to the group to which the user equipment belongs, the selected user equipment processing data in a data portion of the one or more subframes; and responsive to a determination the portion does not corresponds to a group to which the user equipment belongs, the selected user equipment discarding the one or more subframes.

9. The method of claim 6, wherein:

a selected one of the user equipment is a member of the group;

the selected user equipment determines the preamble and the corresponding portion by receiving one or more indications of the preamble from a base station; and performing the one-to-many device-to-device communication further comprises the selected user equipment transmitting the one or more subframes on the band.

10. The method of claim 1, wherein:

the single user equipment determines the preamble and the corresponding portion by receiving one or more indications of the preamble from the base station; and performing the one-to-many device-to-device communication further comprises the single user equipment transmitting the one or more subframes on the band.

11. The method of claim 1, wherein the preamble has a length and the method further comprises determining the length for the preamble based on one or more of transmission power, pathloss to a receiver of a user equipment, a transmission bandwidth, a transmission mode, one or both of channel quality or bit error probability, or one or both of user or data flow quality-of-service requirements.

12. The method of claim 1, wherein the portion comprises all of the preamble.

13. The method of claim 1, wherein the band comprises one of a lightly-licensed band, a licensed-exempt or unlicensed band, a secondary usage of a band of the licensed band, a band in TV white space.

14. A computer program product comprising a non-transitory computer-readable storage medium bearing computer program code embodied therein for use with a computer, the computer program code comprising code for performing the method of:

determining a preamble, at least a portion of which is unique to one or more user equipment for a one-to-many device-to-device communication of one or more subframes on a band, wherein the portion is received from a base station prior to performing the one-to-many device-to-device communication and determining the preamble further comprises constructing the portion using a Zadoff-Chu sequence with a base sequence initialized by one or both of an identification assigned to a single user equipment of the at least one or more user equipment or a physical cell identification of a cell corresponding to the base station; and performing the one-to-many device-to-device communication of the one or more subframes comprising the preamble on the band, wherein one of the user equipment performs the one-to-many device-to-device communication with another one of the user equipment.

15. An apparatus, comprising:

one or more processors; and one or more memories including computer program code, the one or more memories and the computer program code configured, with the one or more processors, to cause the apparatus to perform:

determining a preamble, at least a portion of which is unique to one or more user equipment for a one-to-many device-to-device communication of one or more subframes on a band, wherein the portion is received from a base station prior to performing the one-to-many device-to-device communication and determining the preamble further comprises constructing the portion using a Zadoff-Chu sequence with a base sequence initialized by one or both of an identification assigned to a single user equipment of the at least one or more user equipment or a physical cell identification of a cell corresponding to the base station; and performing the one-to-many device-to-device communication of the one or more subframes comprising the preamble on the band, wherein one of the user equipment performs the one-to-many device-to-device communication with another one of the user equipment.

* * * * *